United States Patent
Kokura

(10) Patent No.: US 11,967,040 B2
(45) Date of Patent: Apr. 23, 2024

(54) INFORMATION PROCESSING APPARATUS, CONTROL METHOD THEREOF, IMAGING DEVICE, AND STORAGE MEDIUM

(71) Applicant: CANON KABUSHIKI KAISHA, Tokyo (JP)

(72) Inventor: Toru Kokura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 17/245,364

(22) Filed: Apr. 30, 2021

(65) Prior Publication Data
US 2021/0358081 A1 Nov. 18, 2021

(30) Foreign Application Priority Data
May 14, 2020 (JP) ................................ 2020-085177

(51) Int. Cl.
| | |
|---|---|
| *G06T 7/30* | (2017.01) |
| *G06F 18/214* | (2023.01) |
| *G06F 18/25* | (2023.01) |
| *G06N 3/04* | (2023.01) |
| *G06N 3/08* | (2023.01) |

(Continued)

(52) U.S. Cl.
CPC .......... *G06T 3/4015* (2013.01); *G06F 18/214* (2023.01); *G06N 3/04* (2013.01); *G06N 3/08* (2013.01); *G06T 3/4046* (2013.01); *G06T 5/002* (2013.01); *G06V 10/764* (2022.01); *G06V 10/82* (2022.01); *G06T 2207/10024* (2013.01);

(Continued)

(58) Field of Classification Search
CPC ..... G06T 3/4015; G06T 3/4046; G06T 5/002; G06T 2207/10024; G06T 2207/20081; G06T 2207/20084; G06F 18/214; G06N 3/04; G06N 3/08; G06N 3/045; G06N 3/084; G06V 10/764; G06V 10/82
See application file for complete search history.

(56) References Cited

U.S. PATENT DOCUMENTS

| | | | |
|---|---|---|---|
| 2014/0037172 A1* | 2/2014 | Madabhushi | G06F 18/214 |
| | | | 382/131 |
| 2015/0163465 A1* | 6/2015 | Li | H04N 25/134 |
| | | | 348/308 |

(Continued)

FOREIGN PATENT DOCUMENTS

JP 2012-095351 A 5/2012

OTHER PUBLICATIONS

Lin Liu, Xu Jia, Jianzhuang Liu, Qi Tian; Joint Demosaicing and Denoising With Self Guidance, Proceedings of the IEEE/CVF Conference on Computer Vision and Pattern Recognition (CVPR), 2020, pp. 2240-2249 (Year: 2020).*

(Continued)

*Primary Examiner* — Andrae S Allison
(74) *Attorney, Agent, or Firm* — Carter, DeLuca & Farrell LLP

(57) ABSTRACT

An object of the technique of the present disclosure is to obtain a demosaic network whose robustness for noise is high. In the technique of the present disclosure, first, a data set including a set of a teacher image with noise and a pupil image with noise is generated. Then, learning of a demosaic network is performed by using an image pair of the teacher image with noise and the pupil image with noise, to both of which noise is added.

18 Claims, 8 Drawing Sheets

(51) Int. Cl.
    *G06T 3/4015*     (2024.01)
    *G06T 3/4046*     (2024.01)
    *G06T 5/00*     (2006.01)
    *G06T 5/20*     (2006.01)
    *G06V 10/764*     (2022.01)
    *G06V 10/82*     (2022.01)

(52) U.S. Cl.
    CPC ............... *G06T 2207/20081* (2013.01); *G06T 2207/20084* (2013.01)

(56) References Cited

U.S. PATENT DOCUMENTS

| | | | | |
|---|---|---|---|---|
| 2015/0215590 A1* | 7/2015 | Nowozin | ............. | H04N 23/843 348/242 |
| 2019/0318260 A1* | 10/2019 | Yasutomi | ............... | G06N 20/00 |
| 2020/0074234 A1* | 3/2020 | Tong | ................... | G06V 10/774 |
| 2020/0202496 A1 | 6/2020 | Kokura | | |
| 2020/0258196 A1 | 8/2020 | Kokura | | |
| 2021/0358081 A1* | 11/2021 | Kokura | .................... | G06N 3/08 |
| 2022/0132001 A1* | 4/2022 | Dinh | ...................... | H04N 23/60 |
| 2022/0309612 A1* | 9/2022 | Takahama | ............ | G06N 3/0464 |

OTHER PUBLICATIONS

Gharbi, Michaël, et al. "Deep joint demosaicking and denoising." ACM Transactions on Graphics (ToG) 35.6 (2016): 1-12. (Year: 2016).*

Hua, Kai-Lung, Shintami Chusnul Hidayati, Fang-Lin He, Chia-Po Wei, and Yu-Chiang Frank Wang. "Context-aware joint dictionary learning for color image demosaicking." Journal of visual communication and image representation 38 (2016): 230-245. (Year: 2016).*

Syu, N.S. et al., "Learning deep convolutional networks for demosaicing" arXiv preprint arXiv: 1802. 03769 (Feb. 11, 2018) pp. 1-14.

Notice of Reasons for Refusal issued by the Japanese Patent Office on Feb. 13, 2024 in corresponding JP Patent Application No. 2020-085177, with English translation.

* cited by examiner

INFORMATION PROCESSING APPARATUS, CONTROL METHOD THEREOF, IMAGING DEVICE, AND STORAGE MEDIUM

BACKGROUND OF THE INVENTION

Field of the Invention

The technique of the present disclosure relates to generation of learning data for machine learning and a learning method.

Description of the Related Art

To an image capturing element that is made use of for an imaging device, such as a digital camera, a color filter is added and the image capturing element has a configuration in which light having a specific wavelength enters each pixel. Then, as the color filter, a color filter having a Bayer array is made use of frequently. The image (RAW image) obtained by performing image capturing with a digital camera adopting the Bayer array color fitter will be a so-called mosaic image in which only the pixel value corresponding to one color of RGB is set to each pixel of the image capturing element. Then, in a general digital camera, a variety of kinds of signal processing, such as demosaic processing to interpolate pixel values of the two remaining colors each pixel does not have, are performed for the RAW image and a color image (RGB image) in which each pixel has the pixel value of each of RGB is generated and output.

In the above-described demosaic processing, the occurrence of a false color and artifact is problematic, and therefore, in addition to a method of applying a conventional linear filter or nonlinear filter, a data-driven interpolation method that applies deep learning has been proposed. The following Japanese Patent Laid-Open No. 2012-095351 and Syu, Nai-Sheng, Yu-Sheng Chen, and Yung-Yu Chuang. "Learning deep convolutional networks for demosaicing." arXiv preprint arXiv: 1802. 03769 (2018), have disclosed a method of learning a convolutional neural network (CNN)-based demosaic network by using a teacher image with little noise.

With the techniques of the above-described Japanese Patent Laid-Open No. 2012-095351 and Syu, Nai-Sheng, Yu-Sheng Chen, and Yung-Yu Chuang. "Learning deep convolutional networks for demosaicing." arXiv preprint arXiv: 1802. 03769 (2018), it is possible to obtain a good RGB image in a case where the amount of noise included in the RAW image is small by performing estimation by using a demosaic network (trained model) obtained by learning.

However, in a case where the amount of noise included in the RAW image is large, there is such a problem that the robustness for noise is low, such as an artifact occurs in the RGB image to be output.

SUMMARY OF THE INVENTION

The information processing apparatus according to the present disclosure is an information processing apparatus that generates learning data for demosaic processing by machine learning and includes: an acquisition unit configured to acquire a first image; and a generation unit configured to generate, based on the first image, a data set including a set of a second image and a third image; wherein the second image is the first image to which noise is added and the third image is a mosaic image obtained by thinning predetermined pixels from the first image by mosaic processing to which noise is added.

Further features of the present invention will become apparent from the following description of exemplary embodiments with reference to the attached drawings.

DESCRIPTION OF THE EMBODIMENTS

Figure 1:
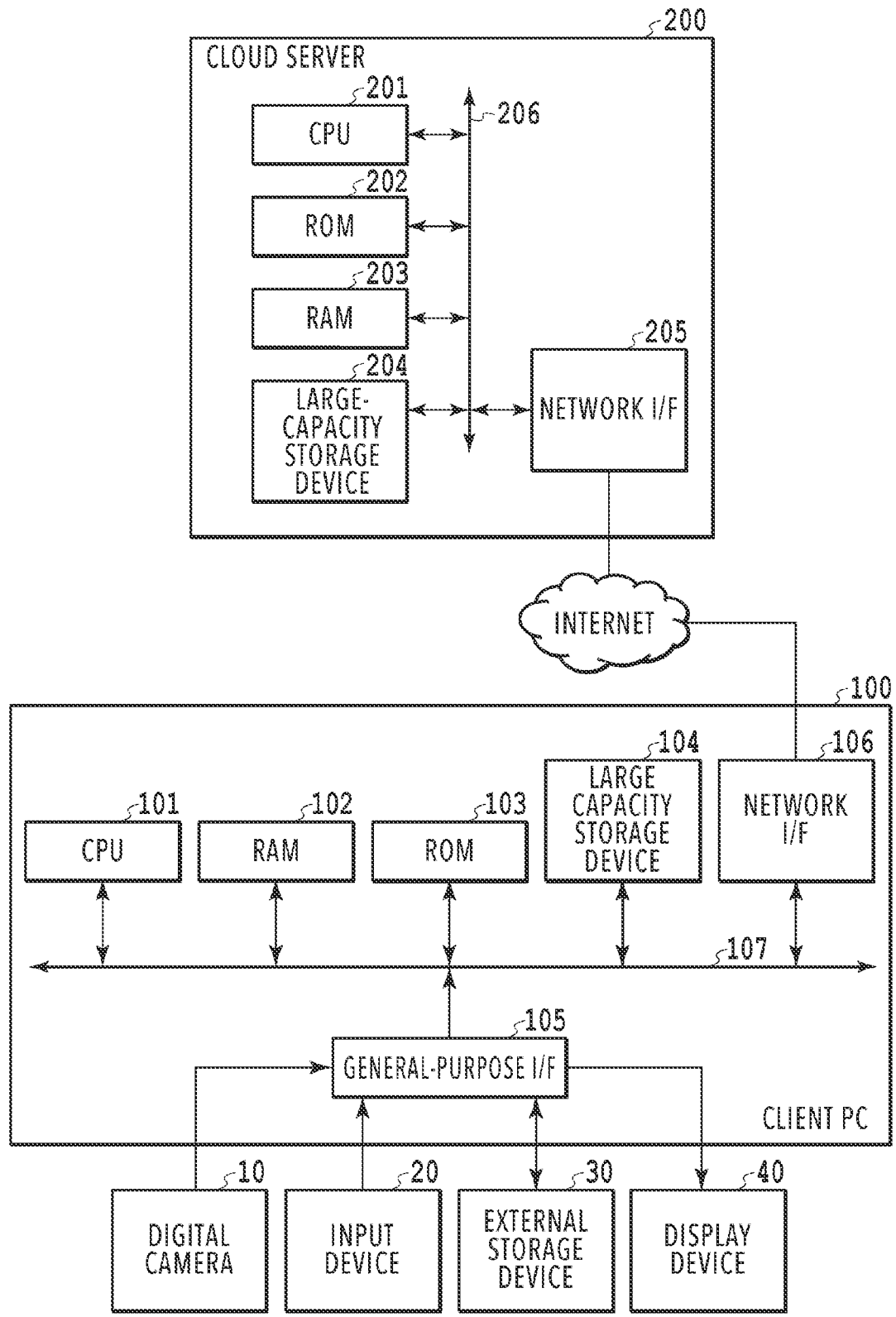
FIG. 1 is a diagram showing an example of a configuration of an information processing system.

Hereinafter, with reference to the added drawings, the present invention is explained in detail in accordance with preferred embodiments. Configurations shown in the following embodiments are merely exemplary and the present invention is not limited to the configurations shown schematically.

<About CNN>

First, a convolutional neural network (CNN) used generally in the image processing technique that applies deep learning, which appears in each embodiment below, is explained. The CNN is a technique to repeat a nonlinear operation after performing convolution of a filter generated by learning for image data. The filter is also called a local receptive field (LRF). The image data that is obtained by performing the nonlinear operation after convolution of the filter for the image data is called a feature map. Further, the learning is performed by using learning data including a pair of input image data and output image data. In brief, generating the value of the filter that can convert input image data into corresponding output image data with a high accuracy from the learning data is learning. Details of this will be described later.

In a case where image data has three channels of RGB or in a case where the feature map includes a plurality of pieces of image data, the filter that is used for convolution also has a plurality of channels accordingly. That is, the convolution filter is represented by a four-dimensional array including the number of channels, in addition to the vertical and horizontal sizes and the number of pieces of image data. The processing to perform the nonlinear operation after convolution of the filter for the image data (or feature map) is indicated in units of layers and the feature map and the filter are represented as, for example, the nth-layer feature map and the nth-layer filter. Further, for example, the CNN in which the filter convolution and the nonlinear operation are repeated three times has a three-layer network structure. The nonlinear operation processing such as this can be formularized as formula (1) below.

$$X_n^{(1)} = f(\Sigma_{k=1}^{K} W_n^{(1)} * X_{n-1}^{(1)} + b_n^{(1)})$$

In formula (1) described above, $W_n$ is an nth-layer filter, $b_n$ is an nth-layer bias, f is a nonlinear operator, $X_n$ is an nth-layer feature map, and * is a convolution operator. Here, (1) at the top left indicates that the filer or feature map is the first filter or feature map. The filter and the bias are generated by learning, to be described later, and called all together "network parameters". As the nonlinear operation, for example, the sigmoid function or ReLU (Rectified Linear Unit) is used. In a case of ReLU, the nonlinear operation is given by formula (2) below.

$$f(X) = \begin{cases} X & \text{if } 0 \leq X \\ 0 & \text{otherwise} \end{cases}$$

As shown in formula (2) described above, among elements of an input vector X, a negative element is zero and a positive element remains the same as it is.

As the network that uses the CNN, ResNet in the image recognition field and its applied RED-Net in the super resolution field are well known. Each makes an attempt to improve the accuracy of the processing by increasing the number of layers of the CNN and performing the filter convolution a number of times. For example, the ResNet is characterized by a network structure in which a path to shortcut the convolutional layers is provided and due to this, implements a multi-layer network as many as 152 layers and implements recognition of high accuracy which is close to a human recognition ratio. The reason the accuracy of the processing improves by the multi-layer CNN is simply that it is possible to represent a nonlinear relationship between input and output by repeating the nonlinear operation a number of times.

<Learning of CNN>

Next, the learning of the CNN is explained. The learning of the CNN is performed by minimizing the objective function generally expressed by formula (3) below for the learning data including a set of input learning image (observed image) data and corresponding output learning image (correct answer image) data.

$$L(\theta) = \frac{1}{n}\sum_{i=1}^{n} \|F(X_i; \theta) - Y_i\|_2^2$$

In formula (3) described above, L is a loss function that measures an error between the correct answer and its estimation. $Y_i$ is ith output learning image data and $X_i$ is ith input learning image data. F is a function that expresses all the operations (formula 1) together performed in each layer of the CNN. Further, θ is a network parameter (filter and bias). Further, $\|Z\|_2$ is the L2 norm and in brief, the root of the sum of squares of elements of a vector Z. Further, n is the total number of pieces of learning data that is used for learning. Generally, the total number of pieces of learning data is large, and therefore, in the stochastic gradient descent (SGD) method, part of the learning image data is selected randomly and used for learning. Due to this, it is possible to reduce the calculation load in the learning using a large number of pieces of learning data. Further, as the object function minimization (optimization) method, a variety of methods are known, such as the momentum method, the AdaGrad method, the AdaDelta method, and the Adam method. The Adam method is given by formula (4) below.

$$g = \frac{\partial L}{\partial \theta_i^t}$$

$$m = \beta_1 m + (1 - \beta_1)g$$

$$v = \beta_2 v + (1 - \beta_2)g^2$$

$$\theta_i^{t+1} = \theta_i^t - \alpha \frac{\sqrt{1-\beta_2^t}}{(1-\beta_1^t)} \frac{m}{(\sqrt{v} + \epsilon)}$$

In formula (4) described above, $\theta_i^t$ is an ith network parameter in tth repetition and g is the gradient of the loss function L relating to $\theta_i^t$. Further, m and v are moment vectors, α is a base learning rate, β1 and β2 are hyper parameters, and ε is a small constant. No selection policy of the optimization method in learning exists, and therefore, basically any method may be used, but it is known that a difference in the learning time occurs because the convergence is different for different methods.

First Embodiment

In the present embodiment, an aspect is explained in which a trained model whose robustness is high is generated by artificially adding noise to a teacher image and a pupil image as learning data, respectively. In the present disclosure, a teacher image and a pupil image are explained in a distinct manner, but it may also be possible to regard both the teacher image and the pupil image as teacher images.

<System Configuration>

FIG. 1 is a diagram showing an example of the configuration of an information processing system according to the present embodiment. In the information processing system shown in FIG. 1, a cloud server 200 in charge of the generation of learning data and demosaic learning and a client PC 100 in charge of demosaic estimation are connected via the internet.

<Hardware Configuration of Client PC>

The client PC 100 of the present embodiment is an image processing apparatus that performs demosaic estimation for a RAW image (mosaic image) that is input from an imaging device by applying trained network parameters provided from the cloud server 200. A user develops the RAW image by making use of an image processing application installed in the client PC 100. The client PC 100 has a CPU 101, a RAM 102, a ROM 103 a large-capacity storage device 104, a general-purpose interface (I/F) 105, and a network I/F 106 and each component is connected to one another by a system bus 107. Further, the client PC 100 is also connected to a digital camera 10, an input device 20, an external storage device 30, and a display device 40 via the general-purpose I/F 105.

The CPU 101 executes programs stored in the ROM 103 by using the RAM 102 as a work memory and centralizedly controls each component of the client PC 100 via the system bus 107. Further, the large-capacity storage device 104 is, for example, an FIDD or an SSD and stores various kinds of data that is handled in the client PC 100. The CPU 101 writes data to the large-capacity storage device 104 and reads data stored in the large-capacity storage device 104 via the system bus 107. The general-purpose I/F 105 is a serial bus interface, for example, such as USB, IEEE 1394, and HDMI (registered trademark). The client PC 100 acquires data from the external storage device 30 (various storage media, for example, such as memory card, CF card, SD card, and USB memory) via the general-purpose I/F 105. Further, the client PC 100 receives user instructions from the input device 20, such as a mouse and a keyboard, via the general-purpose I/F 105. Further, the client PC 100 outputs image data and the like processed by the CPU 101 to the display device 40 (various image display devices, for example, such as liquid crystal display) via the general-purpose I/F 105. Further, the client PC 100 acquires data of a captured image (RAW image) that is a developing processing target from the digital camera 10, which is an imaging device, via the general-purpose I/F 105. The network I/F 106 is an interface for connecting to the internet. The client PC 100 acquires network parameters for demosaic estimation by accessing the cloud server 200 by an installed web browser.

<Hardware Configuration of Cloud Server>

The cloud server 200 of the present embodiment is a server apparatus that provides a cloud service on the internet. In more detail, the cloud server 200 provides network parameters as learning results (trained model) in response to a request from the client PC 100 by generating learning data and performing demosaic learning. The cloud server 200 has a CPU 201, a ROM 202, a RAM 203, a large-capacity storage device 204, and a network I/F 205 and each component is connected to one another by a system bus 206. The CPU 201 controls the entire operation by reading control programs stored in the ROM 202 and performing various kinds of processing. The RAM 203 is used as a temporary storage area, such as a main memory and a work area, of the CPU 201. The large-capacity storage device 204 is a large-capacity secondary storage device, such as an HDD and an SSD, which stores image data and various programs. The network I/F 205 is an interface for connecting to the internet and provides the above-described network parameters in response to a request from a web browser of the client PC 100.

The components of the client PC 100 and the cloud server 200 exist other than those described above, but they are not the main purpose of the present invention, and therefore, explanation thereof is omitted. Further, in the present embodiment, it is supposed that the generation of learning data and demosaic learning are performed by the cloud server 200, the network parameters, which are learning results, are downloaded to the client PC 100, and demosaic estimation of a development-target RAW image is performed. However, the above-described system configuration is an example and the system configuration is not limited to this. For example, the configuration may be one in which the function in the charge of the cloud server 200 is divided into sub-functions and the generation of learning data and demosaic learning are performed by different apparatuses. Further, the configuration may be one in which all the generation of learning data, demosaic learning, and demosaic estimation are performed in the digital camera 10 comprising both the function of the client PC 100 and the function of the cloud server 200.

<Flow of Processing of Entire System>

Figure 2:
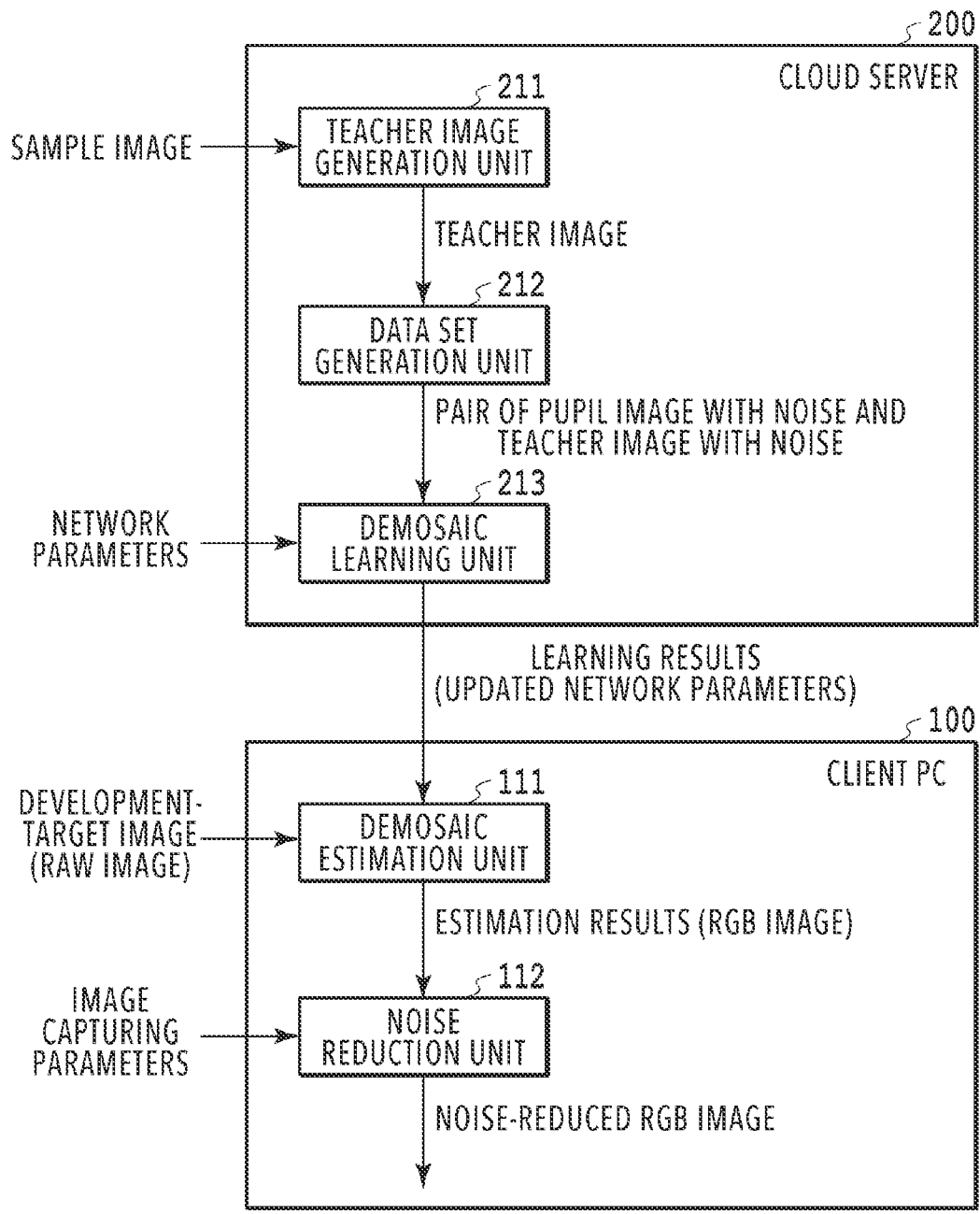
FIG. 2 is a block diagram of the entire information processing system.
Figure 3:
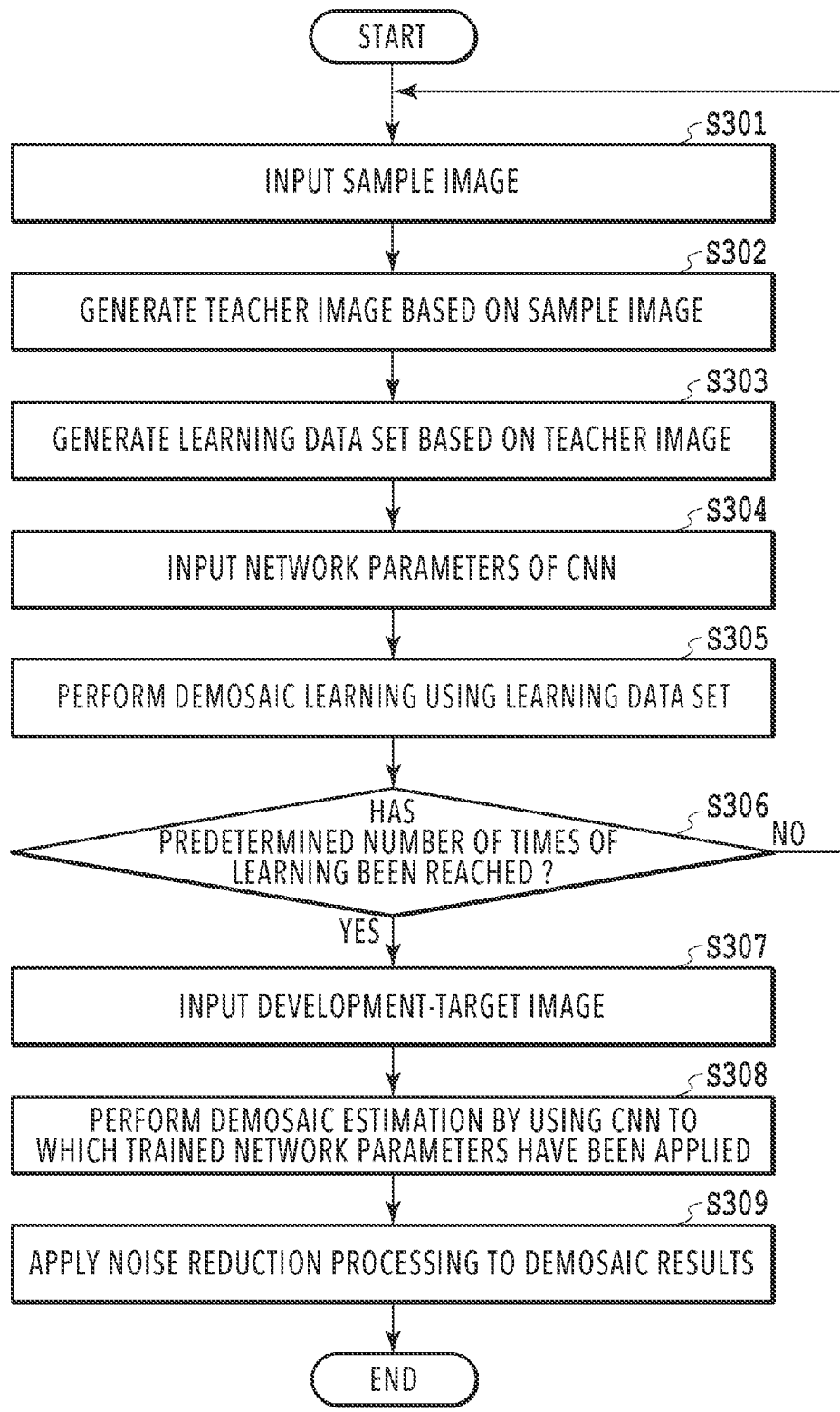
FIG. 3 is a flowchart showing a flow of processing in the information processing system.

Next, various kinds of processing performed in the information processing system of the present embodiment are explained. FIG. 2 is a function block diagram of the entire information processing system and FIG. 3 is a flowchart showing a flow of processing in the information processing system. As shown in FIG. 2, the client PC 100 has a demosaic estimation unit 111 and a noise reduction unit 112. Further, the cloud server 200 has a teacher image generation unit 211, a data set generation unit 212, and a demosaic learning unit 213. Each function unit shown in FIG. 2 is implemented by the CPU 101/201 executing the computer program corresponding to each function unit. However, all or part of the function units shown in FIG. 2 may be implemented by hardware. In the following, explanation is given along the flow in FIG. 3. In the following explanation, symbol "S" means a step.

At S301, a sample image, which is the source of a teacher image, is input to the cloud server 200. The sample image is a RAW image (mosaic image) obtained by performing image capturing with a digital camera and it is desirable that variations of objects and image capturing conditions be rich. As a specific image of the sample image, mention is made of nature photos such as landscapes and animals, human photos such as portraits and sports scenes, artificial object photos such as buildings and products, and the like. Further, it may also be possible to upload a photo obtained by performing image capturing with the digital camera 10 as it is, or it may also be possible to store a captured photo in an HDD or the like and upload the stored photo. The data of the sample image that is input to the cloud server 200 is sent to the teacher image generation unit 211.

Figure 4:
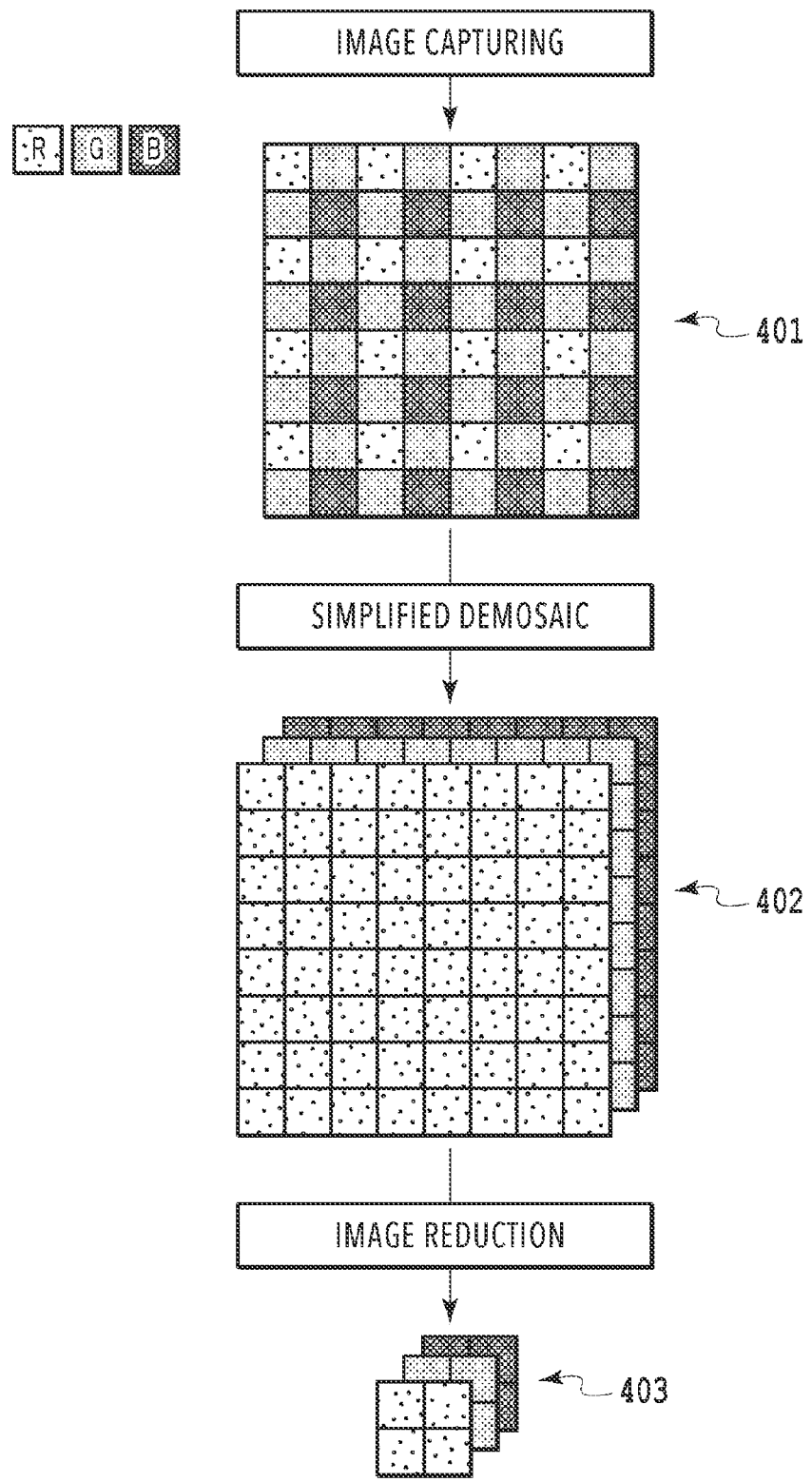
FIG. 4 is a diagram explaining generation of a teacher image.

At S302, the teacher image generation unit 211 generates a teacher image based on the received sample image. FIG. 4 is a diagram explaining the generation of a teacher image. In the following, with reference to FIG. 4, explanation is given.

First, a received sample image 401 is a mosaic image in the Bayer format in which each pixel of the R (red) pixel, the G (green) pixel, and the B (blue) pixel is arranged regularly in the arrangement shown schematically. Here, by applying the simplified demosaic method (for example, the method of Japanese Patent Laid-Open No. 2012-095351) for the sample image 401, an RGB image 402 including three channels of RGB is obtained. After that, the RGB image 402 is reduced so that the number of pixels in the vertical direction and that in the horizontal direction are reduced to one quarter by a method, for example, such as bilinear interpolation and bicubic interpolation. In the RGB image, an artifact, such as moire and a false color, which occurs by the simplified demosaic is included, but this artifact is reduced by the image reduction. The image reduction ratio may be other than 1/4. The processing such as this is performed for all the input sample images and a teacher image 403 corresponding to each sample image is obtained. It may also be possible for the digital camera 10 to perform the processing up to the simplified demosaic and the data of the sample image may be input to the cloud server 200 in the data format of RGB image. The data of the teacher image 403 thus generated and acquired is sent to the data set generation unit 212.

Figure 5:
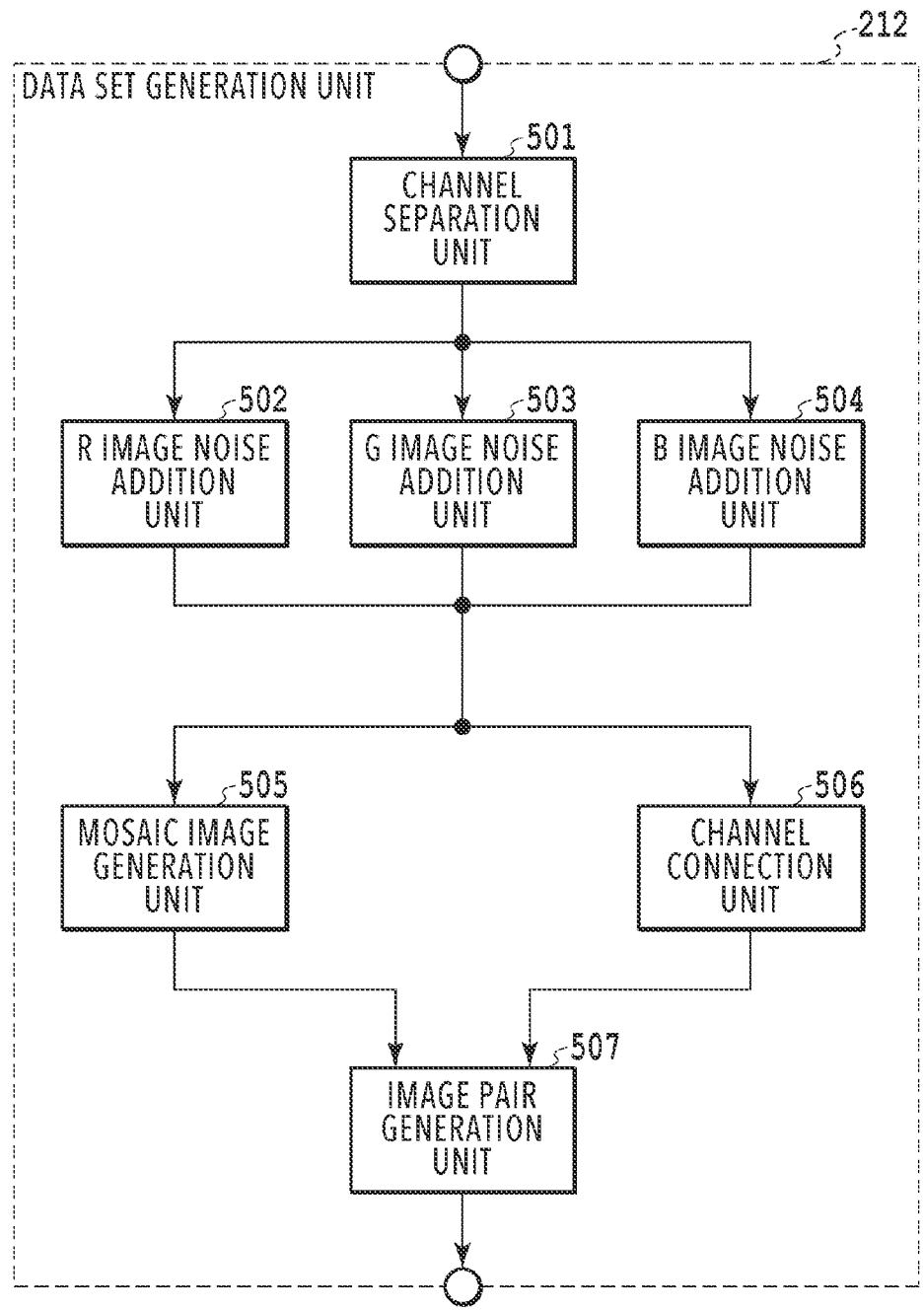
FIG. 5 is a block diagram showing details of a data set generation unit.

At S303, the data set generation unit 212 generates a data set that is used for learning based on the input teacher image group. FIG. 5 is a block diagram showing details of the data set generation unit 212. The data set generation unit 212 includes a channel separation unit 501, an R image noise addition unit 502, a G image noise addition unit 503, a B image noise addition unit 504, a mosaic image generation unit 505, a channel connection unit 506, and an image pair generation unit 507. In the following, with reference to FIG. 5, the generation of a learning data set is explained. The contents that are explained below are performed for each teacher image included in the input teacher image group.

<<Generation of Learning Data Set>>

First, the channel separation unit 501 separates the teacher image including three channels of RGB into images of each channel of each of RGB (in the following, called "channel image"). Each channel image has the same image size and the same bit depth as those of the teacher image. There is a case where the channel image corresponding to each of RGB is described as "R image", "G image", and "B image".

Following the above, the R image noise addition unit 502, the G image noise addition unit 503, and the B image noise addition unit 504 each add noise to the channel image in the charge of itself by using formula (5) below.

$$n_c(x,y) = s_c(x,y) + \sigma_c(x,y) r(x,y), c \in \{R,G,B\}$$

In formula (5) described above, s (x, y) indicates the signal value (pixel value) at coordinates (x, y) in the channel image, r (x, y) indicates a random number that follows the standard normal distribution whose average is "0" and whose variance is "1", and σ (x, y) indicates the standard deviation of noise. Further, n (x, y) indicates the pixel value at the coordinates (x, y) in the channel image after noise is added. Here, the standard deviation σ (x, y) is determined based on the signal value in the channel image before noise is added as indicated in formula (6) below.

$$\sigma_c(x,y) = \sqrt{k_c(s_c(x,y) - I_c)}, c \in \{R,G,B\}$$

In formula (6) described above, k and I are each a predetermined constant. Each constant is determined in accordance with the characteristic of the imaging device used for image capturing of the input RAW image. Specifically, the test chart is captured in advance and the signal value s and the standard deviation n are measured actually from the obtained captured image and k and I are found from the relationship between both. Here, the noise that is added is additive noise that follows the normal distribution based on the standard deviation in formula (6) described above, but the noise may be noise following another distribution or having another addition method. For example, the noise may be noise that follows a predetermined variance that does not depend on luminance. Further, it may also be possible to make noise by forcibly turning 1% of all the pixels into defective pixels (pixels whose pixel value is set to "0" or "255" intentionally in a case where the pixel value is represented by eight bits). Alternatively, it may also be possible to add noise only to the pixels arranged in the vertical (column) direction or the pixels arranged in the horizontal (row) direction in the channel image. The channel images (R image with noise, G image with noise, B image with noise) after noise is added, which are obtained as described above, are sent from each of the noise addition units 502 to 504 to the mosaic image generation unit 505 and the channel connection unit 506, respectively.

Following the above, the mosaic image generation unit 505 generates a pupil image with noise and the channel connection unit 506 generates a teacher image with noise, respectively. In the following, explanation is given in order.

Figure 6:
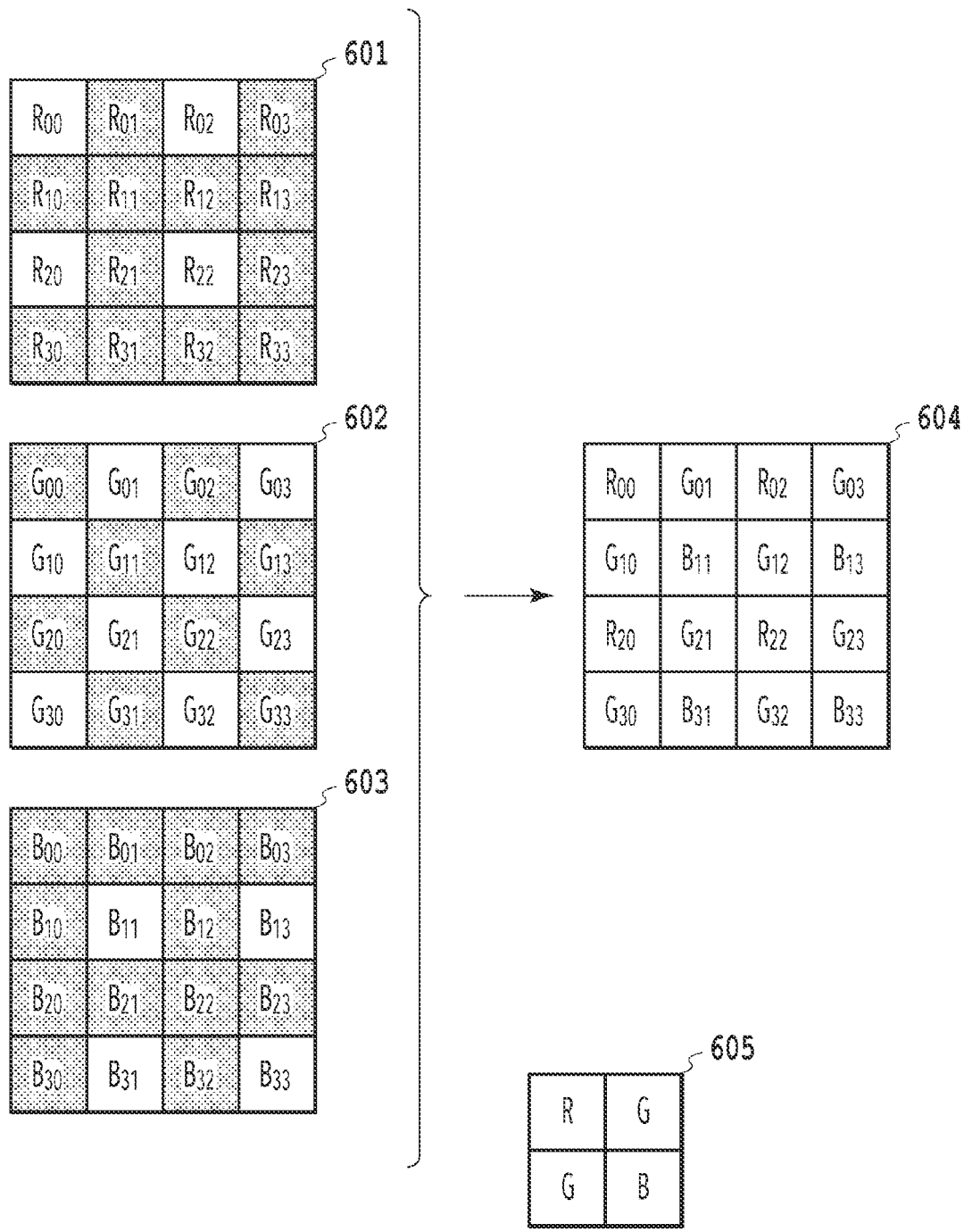
FIG. 6 is a diagram explaining generation of a pupil image with noise.

First, the generation of a pupil image with noise is explained. The pupil image with noise is an image obtained by adding noise to a mosaic image obtained by thinning predetermined pixels from the teacher image based on the color filter array. FIG. 6 is a diagram explaining the generation of a pupil image with noise. In FIG. 6, three images 601 to 603 arranged vertically are each an R image with noise, a G image with noise, and a B image with noise and here, they are represented schematically with the image size of 4×4 pixels. Here, in the R image with noise 601, a total of 16 pixels exist, that is, pixels $R_{00}, R_{01}, R_{02}, \ldots, R_{31}, R_{32}$, and $R_{33}$. The mosaic image generation unit 505 samples the pixel values of the pixels $R_{00}, R_{02}, R_{20}$, and $R_{22}$ in accordance with a color filter array 605 among these 16 pixels and inputs them to the corresponding positions of a buffer 604. Similarly, also from the G image with noise 602, the mosaic image generation unit 505 samples the pixel values of eight pixels $G_{01}, G_{03}, G_{10}, G_{12}, G_{21}, G_{23}, G_{30}$, and $G_{32}$ in accordance with the color filter array 605 and inputs them to the corresponding positions of the buffer 604. Further, also from the B image with noise 603, the mosaic image generation unit 505 samples the pixel values of four pixels $B_{11}$, $B_{13}, B_{31}$, and $B_{33}$ in accordance with the color filter array 605 and inputs them to the corresponding positions of the buffer 604. Due to this, the image that the buffer 604 shows after the pixel values are input is a mosaic image including noise. The mosaic image thus obtained is sent to the image pair generation unit 507 as a pupil image with noise. Here, the Bayer array is used as the color filter array, but the color filter array may be determined in accordance with the image format of the input RAW image, and therefore, it may also be possible to use another color filter array for example, such as X-Trans.

Following the above, the generation of a teacher image with noise is explained. The channel connection unit 506 connects the three channel images (R image with noise, G image with noise, B image with noise) received from each of the noise addition units 502 to 504 in the channel direction. The image thus obtained, which includes the three channels of RGB including noise, is a teacher image with noise. This teacher image with noise has the same size, the same bit depth, and the same number of channels as those of the teacher image generated by the teacher image generation unit 211. Further, in the pixel common to the teacher image with noise generated as described above and the pupil image with noise, the value of the added noise is substantially the same.

Following the above, the image pair generation unit 507 generates an image pair of the pupil image with noise received from the mosaic image generation unit 505 and the corresponding teacher image with noise received from the channel connection unit 506. The generated image pair (data set) is sent to the demosaic learning unit 213.

Explanation is returned to the flow in FIG. 3.

At S304, the above-described network parameters that are applied to the CNN used for the demosaic learning are input to the cloud server 200. The network parameters here are coefficients of each filter configuring the CNN. The network parameters are set as random numbers that follow the "normal distribution of He". The normal distribution of He is the normal distribution whose average is "0" and whose variance is "$\sigma_h$". The "$\sigma_h$" is expressed by formula (7) below.

$$\sigma_h = \sqrt{\frac{2}{m}}$$

In formula (7) described above, m is the number of neurons of each filter in the CNN. The above-described contents are an example and it may also be possible to determine the network parameters by another method. The input network parameters are sent to the demosaic learning unit 213.

Figure 7:
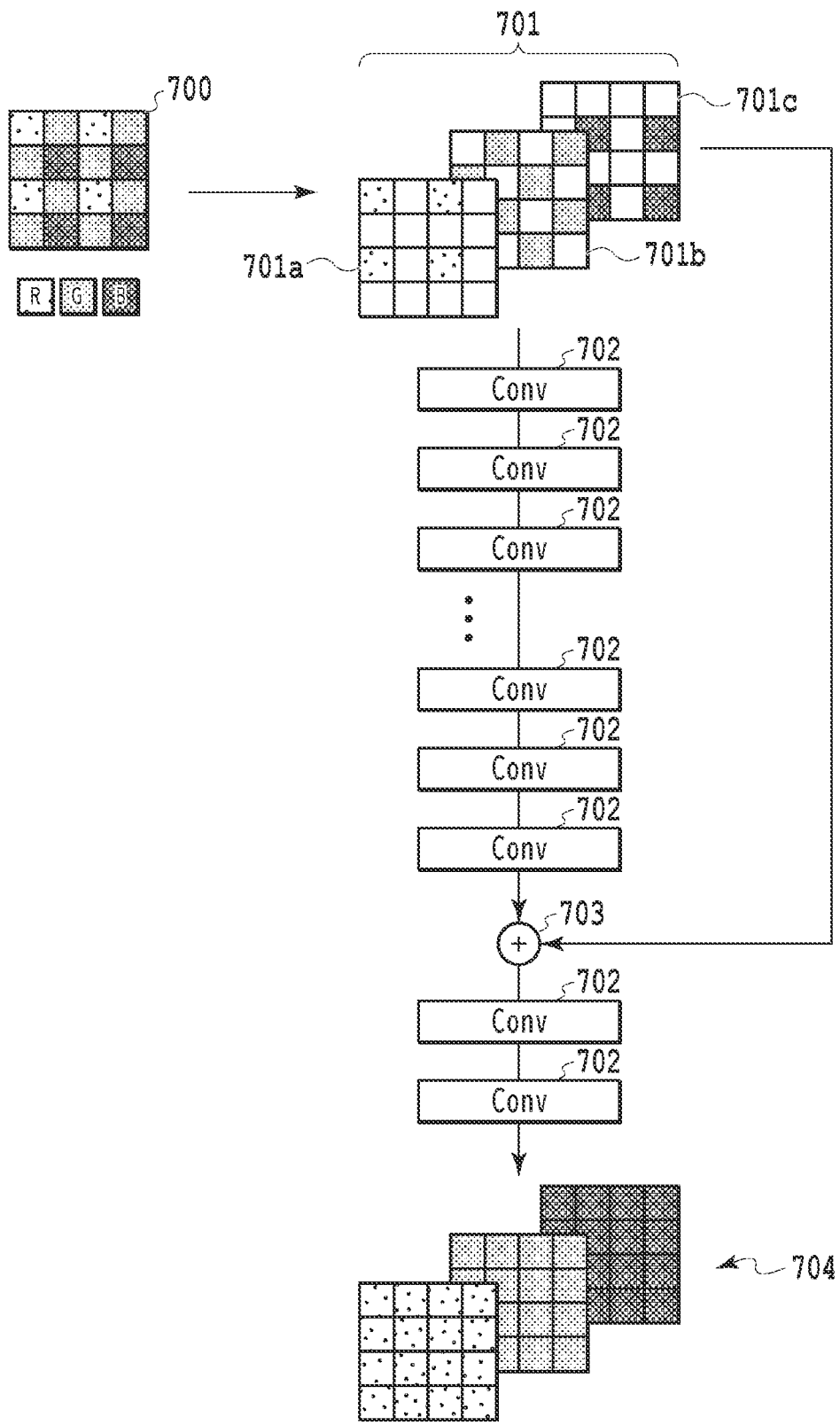
FIG. 7 is a diagram explaining a structure of a CNN and a flow of learning.

At S305, the demosaic learning unit 213 learns the CNN by using the data set generated at S303 after initializing the weight of the CNN by using the received network parameters. For the learning, for example, the CNN disclosed in Syu, Nai-Sheng, Yu-Sheng Chen, and Yung-Yu Chuang. "Learning deep convolutional networks for demosaicing." arXiv preprint arXiv: 1802. 03769 (2018). is used. FIG. 7 is a diagram explaining the structure of the CNN and the flow of the learning. In the following, with reference to FIG. 7, the demosaic learning according to this step is explained in detail.

The CNN includes a plurality of filters 702 performing the operation in formula (1) described previously. To this CNN, a pupil image with noise 700 included in the pair image described previously is input. At this time, the pupil image with noise 700 is converted into a defect image 701 of three channels as shown in FIG. 7 and then input. In an R channel 701a in the defect image 701, only the pixels of the R component of the pupil image with noise 700 are included and to the other pixels, a defect value (0) is set. This is also the same with the G channel and the B channel. That is, in a G channel 701b, only the pixels of the G component of the pupil image with noise 700 are included and to the other pixels, the defect value (0) is set. Further, in a B channel 701c, only the pixels of the B component of the pupil image with noise 700 are included and to the other pixels, the defect value (0) is set. It may also be possible to set the defect value by performing interpolation by a method, such as bilinear interpolation. Next, a feature map is calculated by sequentially applying the filters 702 to the defect image 701. Following this, by a connection layer 703, the calculated feature map and the defect image 701 are connected in the channel direction. In a case where the number of channels of the feature map is $n_1$ and that of the defect image is $n_2$, the number of channels of the connection results is $(n_1+n_2)$. Following this, the filters 702 are applied to the connection results and three channels of RGB are output from the last filter. Due to this, images including three channels of RGB are obtained as estimation results 704. Then, a loss function value is obtained by finding a difference between the obtained estimation results 704 and the teacher image with noise included in the pair image and calculating the average of the entire image. Then, by using the obtained loss function value, the network parameters are updated by back propagation or the like.

At S306, whether or not the demosaic learning is completed is determined. The completion of the learning is determined by determining whether or not the number of times of repetition of the learning (updating of network parameters) has reached a predetermined value. The determination criterion of the completion of the learning is not limited to the number of times of repetition. For example, it may also be possible to determine whether the amount of change in the network parameters at the time of updating is smaller than a predetermined value or whether the difference between the estimation results and the teacher image with noise is smaller than a predetermined value. In a case where the learning is not completed, the processing returns to S301, and the next image pair is generated and the learning is continued. At the time of generating the next image pair, it may also be possible to make use of again the sample image and the teacher image used in the past learning. In that case, each of the noise addition units 502 to 504 within the data set generation unit 212 adds noise each time in accordance with a new random number. Consequently, to the same teacher image, different noise may be added each time of learning. By doing so, it is possible to perform learning by obtaining a teacher image with noise whose contents are different (added noise is different) even though the teacher image belongs to the same image, and therefore, it is possible to improve robustness for noise. It may also be possible to add the same noise to the same image without fail by storing the noise that is added once. The learning results (updated network parameters) thus obtained are provided to the client PC 100 in response to a network parameter acquisition request, and so on. The client PC 100 stores the received network parameters in the RAM 102 or the large-capacity storage device 104. The phase up to here is the learning phase in the cloud server 200. Next, the estimation phase in the client PC 100 is explained.

At S307, the mosaic image (RAW image) that is the target of developing processing including demosaic is input. It may also be possible to directly input the RAW image obtained in advance by performing image capturing with the digital camera 10, or it may also be possible to read the RAW image captured in advance and stored in the large-capacity storage device 104. Further, image capturing parameters, such as the ISO sensitivity at the time of capturing the input RAW image, are also input. The data of the input RAW image is sent to the demosaic estimation unit 111 and the input image capturing parameters are sent to the noise reduction unit 112.

At S308, the demosaic estimation unit 111 constructs the same CNN as that used in the learning in the demosaic learning unit 213 and demosaic the input RAW image. At this time, the existing network parameters are initialized by the updated network parameters received from the cloud server 200. After this, an RGB image is obtained by inputting the input RAW image to the CNN (trained demosaic network) to which the updated network parameters have been applied and performing demosaic estimation by the same method as that performed in the demosaic learning unit 213. The RGB image obtained by the demosaic estimation is sent to the noise reduction unit 112.

At S309, the noise reduction unit 112 performs noise reduction processing for the RGB image as the estimation results. For the noise reduction processing, for example, it may be possible to apply a publicly known method, such as bilateral filter. Further, it is sufficient to determine a parameter relating to the intensity at which noise reduction is applied (noise intensity) based on the input image capturing parameters.

The above is the flow of the processing performed in the information processing system of the present embodiment. The standard deviation σ of the noise that is added by each of the noise addition units 502 to 504 may also be α (<1) times the right side represented by formula (6') below.

$$\sigma_c(x,y) = \alpha\sqrt{k_c(s_c(x,y)-I_c)}, c \in \{R,G,B\}$$

In a case where formula (6') described above is adopted, first, learning is performed with α=1 and the demosaic estimation using the learning results thereof is performed and then the artifact in the results image is checked. In a case where the intensity of the artifact is less than or equal to a predetermined value, the learning is performed again with the value of α being reduced by a predetermined ratio (for example, 10%) and the demosaic estimation using the learning results thereof is performed, and then, the artifact in the results image is checked. This is repeated and α with which the artifact is less than or equal to the predetermined value and the minimum is searched for and the results of performing the learning with the found α are provided to the demosaic estimation unit 111 as the final learning results. What is required is to find the optimum value of α, and therefore, the search method is arbitrary. In this case, it is possible to reduce the amount of noise that is added to the teacher image with noise and suppress over-learning.

MODIFICATION EXAMPLE

In the present embodiment, noise addition is performed by the data set generation unit 212 within the cloud server 200, but this is not limited. For example, it may also be possible to perform noise addition on the side of the imaging device by setting a condition (high sensitivity, low illuminance, high shutter speed, small aperture width and the like) under which noise increases in the captured image at the time of obtaining a sample image by performing image capturing with the digital camera 10.

Figure 8:
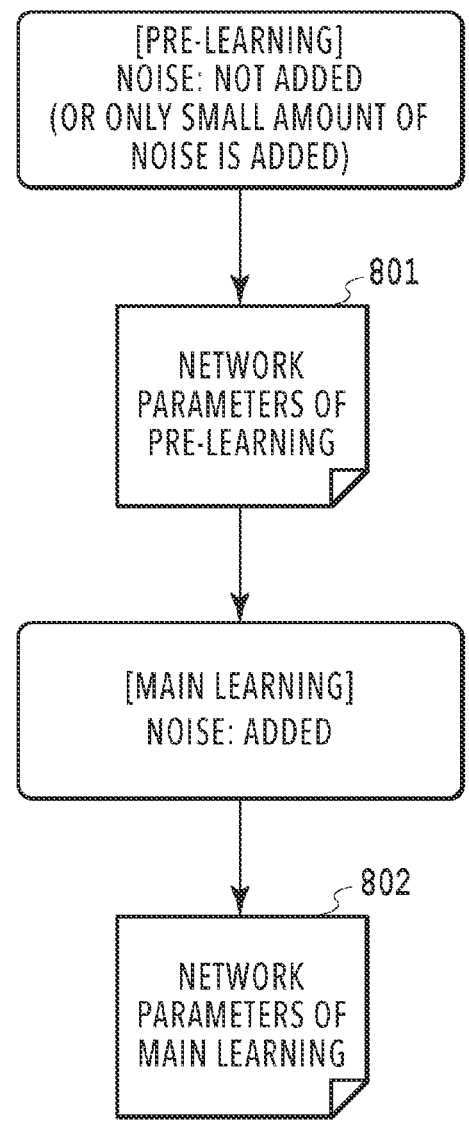
FIG. 8 is a diagram explaining a way of thinking of a modification example.

Further, it may also be possible to add noise stepwise. For example, it may also be possible to perform pre-learning in the state where no noise is added and perform the main learning after adding noise. FIG. 8 is a diagram explaining a way of thinking of the present modification example. First, in the pre-learning, the amount of noise that each of the noise addition units 502 to 504 adds at the time of the generation of an image pair in the data set generation unit 212 is set to "0 (or a small amount of noise substantially equivalent to 0)". Then, the learning by the above-described method is performed. Due to this, network parameters 801 suitable to a RAW image without noise are obtained. Following the above, in the main learning, each of the noise addition units 502 to 504 adds noise at a predetermined level at the time of the generation of an image pair in the data set generation unit 212. Then, the same learning as that of the above-described embodiment is performed. At this time, the network parameters that are input to the demosaic learning unit 213 are the network parameters obtained by the pre-learning and the demosaic learning unit 213 performs the learning by using these as an initial values. Due to this, network parameters 802 suitable to a RAW image with noise are obtained. It may also be possible to regard the trained network parameters read from the memory or acquired from the web as the results of the pre-learning and perform the main learning by using these as the initial values. By performing demosaic estimation by using the network parameters obtained by performing the learning in the two stages as described above, it is made possible to obtain a demosaic image with less artifact for both the RAW image with noise and the RAW image without noise. Further, by performing the pre-learning with a teacher image without noise that is easy to learn and after that, performing the main learning with a teacher image that is difficult to learn, the far-reaching artifact suppression effect is obtained art a small calculation cost based on the way of thinking of the curriculum learning. The number of stages of learning is not limited to only two and it may also be possible to perform the learning in a plurality of stages, such as three or more stages, while increasing the amount of noise. Further, it may also be possible to dynamically increase the amount of noise to be added in the learning in one stage, that is, change the amount of noise to be added stepwise so that the intensity of noise to be added becomes higher in accordance with the progress of the learning.

In the developing processing of the present embodiment, the noise reduction is performed after the demosaic, but on the contrary, it may also be possible to perform the demosaic after the noise reduction. In the configuration in which the demosaic is performed after the noise reduction, in a case where the noise in the development-target input RAW image is not removed completely by the noise reduction processing, the mosaic image including a large amount of noise is the demosaic estimation target. Even in the case such as this, it is possible to obtain the same estimation results by the demosaic estimation using the demosaic network whose robustness is high.

As above, according to the present embodiment, by performing the learning by adding noise to both the teacher image and the pupil image, the demosaic network whose robustness for noise is high is obtained. Due to this, even in a case where a large amount of noise is included in the development-target RAW image, it is possible to obtain estimation results with less artifact in the demosaic estimation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to obtain a demosaic network whose robustness for noise is high.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-085177, filed May 14, 2020 which is hereby incorporated by reference wherein in its entirety.

What is claimed is:

1. An information processing apparatus that generates learning data for demosaic processing by machine learning, the apparatus comprising:
 one or more circuits; or
 one or more processors and at least one memory, the at least one memory being coupled to the one or more processors and having stored thereon instructions executable by the one or more processors, wherein at least one of the one or more circuits or the execution of the instructions cause the information processing apparatus to function as:
 an acquisition unit configured to acquire a first image; and
 a generation unit configured to generate, based on the first image, a data set including a set of a second image and a third image;

wherein the second image is the first image to which noise is added and the third image is a mosaic image obtained by thinning predetermined pixels from the first image by mosaic processing to which noise is added, and it is used for the machine learning as a pair of the second image, wherein the at least one of the one or more circuits or the execution of the instructions cause the information processing apparatus to cause the generation unit to additionally function as:

a separation unit configured to separate the first image into channel images corresponding to each channel of RGB;

an addition unit configured to add noise to each of the channel images;

a mosaic image generation unit configured to generate a mosaic image to which noise is added by sampling, in accordance with a color filter array, predetermined pixels in each channel image to which the noise is added by the addition unit;

a connection unit configured to generate an image including three channels of RGB to which noise is added by connecting each channel image to which the noise is added by the addition unit; and an image pair generation unit configured to obtain the data set by taking a demosaic image to which the noise is added as the third image and the image including three channels of RGB to which the noise is added as the second image.

2. The information processing apparatus according to claim 1, wherein
the demosaic processing is performed by a network using a convolutional neural network.

3. The information processing apparatus according to claim 1, wherein
in a pixel common to the second image and the third image, a value of added noise is substantially the same.

4. The information processing apparatus according to claim 1, wherein
the addition unit adds noise whose characteristic is different to at least two channel images of each of the channel images.

5. The information processing apparatus according to claim 1, wherein
the addition unit adds luminance-dependent noise whose standard deviation of noise of each pixel depends on a signal value of each pixel.

6. The information processing apparatus according to claim 5, wherein
the standard deviation is expressed by a formula below $$\sigma = \sqrt{k(s-1)}$$

and in the formula, σ indicates the standard deviation, s indicates the signal value of each pixel, and k and l indicate constants.

7. The information processing apparatus according to claim 1, wherein
the addition unit determines noise that is added to the first image in accordance with a random number each time the first image is input.

8. The information processing apparatus according to claim 7, wherein
the addition unit adds the same noise to the same first image.

9. The information processing apparatus according to claim 1, wherein the at least one of the one or more circuits or the execution of the instructions cause the information processing apparatus to additionally function as:
a learning unit configured to perform learning of the demosaic processing by using the data set generated by the generation unit.

10. The information processing apparatus according to claim 9, wherein
the learning unit performs new learning by taking a trained network parameter obtained by performing the learning as an initial value.

11. The information processing apparatus according to claim 10, wherein
the trained network parameter is a network parameter obtained by learning using the first image to which an amount of noise is added, which is small compared to that of noise that is added by the addition unit, or a network parameter obtained by learning using the first image to which noise is not added.

12. The information processing apparatus according to claim 10, wherein the at least one of the one or more circuits or the execution of the instructions cause the information processing apparatus to additionally function as:
an acquisition unit configured to acquire a development-target RAW image;
an estimation unit configured to perform, for the RAW image, demosaic processing by estimation using the trained network parameter obtained by the learning; and
a noise reduction unit configured to perform noise reduction processing for an RGB image including three channels of RGB, which is obtained by the demosaic processing in the estimation unit.

13. The information processing apparatus according to claim 12, wherein
intensity of noise that the addition unit adds is lower than intensity of noise included in the RAW image.

14. The information processing apparatus according to claim 1, wherein the at least one of the one or more circuits or the execution of the instructions cause the information processing apparatus to additionally function as:
a learning unit configured to perform learning of the demosaic processing by using the data set generated by the generation unit, wherein
the addition unit changes intensity of noise that is added in accordance with progress of the learning.

15. The information processing apparatus according to claim 14, wherein
the addition unit increases intensity of noise that is added in accordance with progress of the learning.

16. An information processing method of generating learning data for demosaic processing by machine learning, the method comprising the steps of:
acquiring a first image; and
generating, based on the first image, a data set including a set of a second image and a third image;
wherein
the second image is the first image to which noise is added and
the third image is a mosaic image obtained by thinning predetermined pixels from the first image by mosaic processing to which noise is added, and it is used for the machine learning as a pair of the second image,
wherein at least one of one or more circuits or execution of instructions cause an information processing apparatus to cause a generation unit to additionally function as:

a separation unit configured to separate the first image into channel images corresponding to each channel of RGB;

an addition unit configured to add noise to each of a channel image;

a mosaic image generation unit configured to generate a mosaic image to which noise is added by sampling, in accordance with a color filter array, predetermined pixels in each channel image to which the noise is added by the addition unit;

a connection unit configured to generate an image including three channels of RGB to which noise is added by connecting each channel image to which the noise is added by the addition unit; and an image pair generation unit configured to obtain the data set by taking a demosaic image to which the noise is added as the third image and the image including three channels of RGB to which the noise is added as the second image.

17. A non-transitory computer readable storage medium storing a program for causing a computer to perform an information processing method of generating learning data for demosaic processing by machine learning, the method comprising the steps of:

acquiring a first image; and generating, based on the first image, a data set including a set of a second image and a third image;

wherein the second image is the first image to which noise is added and the third image is a mosaic image obtained by thinning predetermined pixels from the first image by mosaic processing to which noise is added, and it is used for the machine learning as a pair of the second image, wherein at least one of one or more circuits or execution of instructions cause an information processing apparatus to cause a generation unit to additionally function as:

a separation unit configured to separate the first image into channel images corresponding to each channel of RGB;

an addition unit configured to add noise to each of a channel image;

a mosaic image generation unit configured to generate a mosaic image to which noise is added by sampling, in accordance with a color filter array, predetermined pixels in each channel image to which the noise is added by the addition unit;

a connection unit configured to generate an image including three channels of RGB to which noise is added by connecting each channel image to which the noise is added by the addition unit; and an image pair generation unit configured to obtain the data set by taking a demosaic image to which the noise is added as the third image and the image including three channels of RGB to which the noise is added as the second image.

18. An imaging device comprising:

one or more circuits; or one or more processors and at least one memory, the at least one memory being coupled to the one or more processors and having stored thereon instructions executable by the one or more processors, wherein at least one of the one or more circuits or the execution of the instructions cause the imaging device to function as:

an input unit configured to input an image; and a processing unit configured to perform demosaic processing by using a trained model obtained by machine learning using a data set including a pair of a second image and a third image;

wherein the second image is a first image to which noise is added, the third image is a mosaic image obtained by thinning predetermined pixels from the first image by mosaic processing to which noise is added, and it is used for the machine learning as a pair of the second image, and the processing unit performs the demosaic processing for the input image, wherein the at least one of the one or more circuits or the execution of the instructions cause the imaging device to cause a generation unit to function as:

a separation unit configured to separate the first image into channel images corresponding to each channel of RGB;

an addition unit configured to add noise to each of the channel images;

a mosaic image generation unit configured to generate a mosaic image to which noise is added by sampling, in accordance with a color filter array, predetermined pixels in each channel image to which the noise is added by the addition unit;

a connection unit configured to generate an image including three channels of RGB to which noise is added by connecting each channel image to which the noise is added by the addition unit; and an image pair generation unit configured to obtain the data set by taking the demosaic image to which the noise is added as the third image and the image including three channels of RGB to which the noise is added as the second image.

* * * * *